United States Patent [19]

Ziemek et al.

[11] Patent Number: 4,893,892
[45] Date of Patent: Jan. 16, 1990

[54] METHOD AND APPARATUS FOR CONNECTING MULTIPLE FIBER OPTIC CONDUCTORS

[75] Inventors: Gerhard Ziemek; Harry Staschewski, both of Langenhagen; Klaus Procher, Lehrte, all of Fed. Rep. of Germany

[73] Assignee: Kabelmetal Electro GmbH, Hanover, Fed. Rep. of Germany

[21] Appl. No.: 244,847

[22] Filed: Sep. 15, 1988

[30] Foreign Application Priority Data

Oct. 23, 1987 [DE] Fed. Rep. of Germany ....... 3735886

[51] Int. Cl.⁴ .............................................. G02B 6/40
[52] U.S. Cl. ............................. 350/96.22; 350/96.21; 65/4.2; 65/4.21
[58] Field of Search ................. 350/96.2, 96.21, 96.22; 65/4.2, 4.21, 42

[56] References Cited

U.S. PATENT DOCUMENTS 3,819,442  6/1974  Brushenko ..................... 65/4.2 X
4,715,876  12/1989 Osaka et al. .................... 65/2 X
4,725,297  2/1988  Gigsby et al. ................ 350/96.21 X
4,812,010  3/1989  Osaka et al. ................. 350/96.21 X

FOREIGN PATENT DOCUMENTS 61-179404  8/1986  Japan .............................. 350/96.22
63-56619   3/1988  Japan .............................. 350/96.22

Primary Examiner—John D. Lee
Assistant Examiner—John Ngo
Attorney, Agent, or Firm—James C. Jangarathis

[57] ABSTRACT

There is disclosed a method and apparatus for fixing a predetermined spacial orientation of exposed end portions of plurality of optical fibers included within a conductor unit; extending such exposed end portions between two terminal blocks for maintaining an axial tension therein; and scratching a surface of each of such end portions held in tension in a common transverse plane for causing each of such end portions to break and form a new end face. After such breaking, the spacial orientation of the remaining exposed end portions of the optical fibers is continued during the individual welding thereto of aligned end faces of a plurality of optical fibers of a second conductor unit.

13 Claims, 2 Drawing Sheets

METHOD AND APPARATUS FOR CONNECTING MULTIPLE FIBER OPTIC CONDUCTORS

The invention relates to method and apparatus for connecting a first plurality of optical fibers to a second plurality of optical fibers; and, more particularly, to connecting such pluralities of optical fibers disposed between support tapes.

BACKGROUND OF THE INVENTION

Optical fibers of priorly known optical cables have been susceptible to increases in attenuation because of mechanical and thermal stress. In an endeavor to avoid such stress optical fiber cables have been developed that include a plurality of ribbon-type light conductor units, each containing a plurality of optical fibers sandwiched between fiberglass-reinforced tapes. By having such tapes bonded to each other and to the plurality of optical fibers contained therebetween, the optical fibers cannot freely move, thus minimizing mechanical stress. Such fiberglass-reinforced tapes preferably have a coefficient of thermal expansion comparable to that of the optical fibers, and a tensile strength that permits a considerable amount of tensile stress to be absorbed by the tapes before elongation.

In the manufacture of ribbon-type light conductor units, an efficient in line connecting method is an imperative for the fabrication of extended lengths of such units. More specifically, there is a need to efficiently interconnect each of the optical fibers of a first such unit to a corresponding optical fiber of a second such unit so as to provide a continuous light transmission path of minimal attenuation through the interconnected optical fibers.

Previously, optical fibers have been welded at their end faces to the end faces of other optical fibers by the method of individually welding each pair of optical fibers. To avoid increases in light attenuation end faces of the optical fibers were formed to have plane surfaces. Cutting mechanisms for achieving a plane surface at the end face of an optical fiber are priorly known. Such mechanisms were employed in the manner of scratching an outer surface of the optical fiber with a cutting tool, and then applying a pulling force to the optical fiber to cause a separation or break at the scratch location.

OBJECT OF THE INVENTION

An object of the present invention is to provide a novel method and apparatus for connecting a first plurality of optical fibers to a second plurality of optical fibers, each of such plurality of optical fibers, extending parallel to each other between two support tapes to form a light conductor unit.

Another object of the present invention is to provide a novel method and apparatus for multiple end cutting of the optical fibers of the two light conductor units and the welding of adjacent aligned ends of such optical fibers of such units.

Still another object of the present invention is to provide a novel method and apparatus for connecting two light conductor units, each comprised of a plurality of optical fibers sandwiched between reinforced tapes, without separating the sandwich constructions other than in the immediate vicinity of the connections.

SUMMARY OF THE INVENTION

These and other objects of the present invention are achieved by a novel method and apparatus for removing end portions of the support tapes from the plurality of optical fibers positioned therebetween; fixing the spacial orientation of the exposed end portions of the optical fibers while maintaining such end portions in axial tension; scratching a surface of each of the end portions in a common plane transverse to the axial direction of the optical fibers, such scratching causing each end portion to separate and form a new end face; and maintaining the spacial orientation of each such new end face while welding thereto end faces of the optical fibers of a second plurality.

BRIEF DESCRIPTION OF THE DRAWINGS

A better understanding of the present invention as well as the objects and advantages thereof will become apparent upon consideration of the following detailed disclosure thereof, especially when taken with the accompanying drawings; wherein

Referring to FIGS. 1 and 2, there is illustrated a light conductor unit 1 comprised of a plurality of plastic covered, optical fibers 2 sandwiched between two support tapes 5 and 6, which maintain a predetermined spacial orientation of the optical fibers. The plastic covered, optical fibers 2 are each comprised of an optical fiber 3 with a plastic coating 4. The support tapes 5 and 6 are disposed in close proximity to each other in the intermediate spaces between the plastic covered, optical fibers 2, and are bonded to each other and to the optical fibers. The support tapes 5 and 6 adhere firmly to the plastic coverings 4 of the optical fibers; but may be readily peeled therefrom during a splicing operation. The plastic coverings 4 exposed upon the peeling away of a section of the support tapes 5 and 6, are removable from the plurality of optical fibers 3, by using, for example, a conventional methylene chloride procedure.

The support tapes 5 and 6 is comprised of fiberglass-reinforced material. However, such tape material is merely exemplary of an appropriate material, the criteria of selection being a tension resistant material whose coefficient of thermal expansion is comparable to the coefficient of expansion of the material of which the optical fibers are comprised, e.g. glass.

An understanding of the invention is furthered by the following description in association with FIGS. 1-5, and 7.

Figure 1:
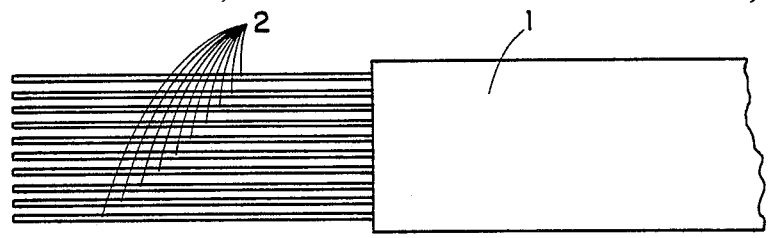
FIG. 1 is a plan view of a length of a light conductor unit comprising a plurality of optical fibers sandwiched between two reinforced tapes.
Figure 2:
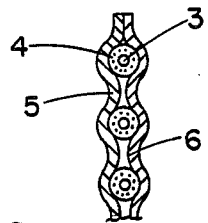
FIG. 2 is a partial cross-sectional view of the conductor unit of FIG. 1, enlarged for illustration.

Initially, an end portion of each of the support tapes 5 and 6 are peeled away from the adjacent portions of the plurality of plastic covered, optical fibers 2 (FIG. 1). Thereafter, the exposed portions of plastic coverings 4 are removed, all at the same time by a conventional methylene chloride process, thus exposing the underlying portions of the plurality of optical fibers 3. Then the plurality of exposed portions of the plurality of optical fibers 3 are extended through a terminal block 7 which is of a design to fix the position of each of such exposed portions of optical fibers 3 in the predetermined spacial orientation of the optical fibers 3 of the conductor unit 1.

Figure 3:
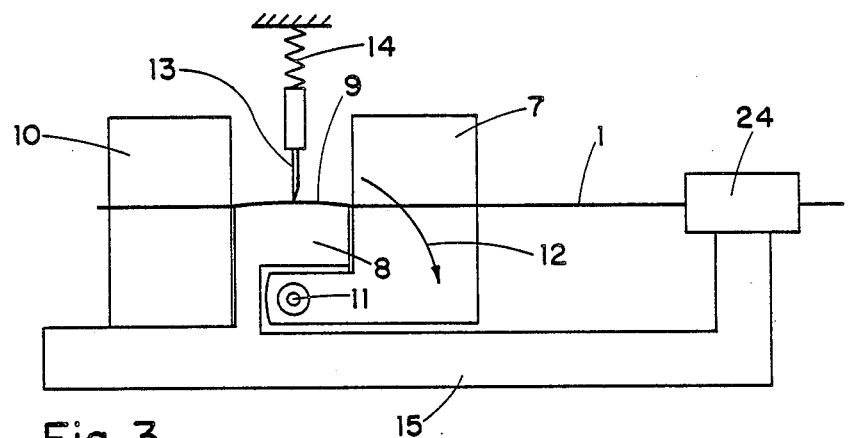
FIG. 3 is a side diagrammatic illustration of an apparatus in accordance with the instant invention for end cutting the plurality of optical fibers of the light conductor unit of FIG. 1.
Figure 4:
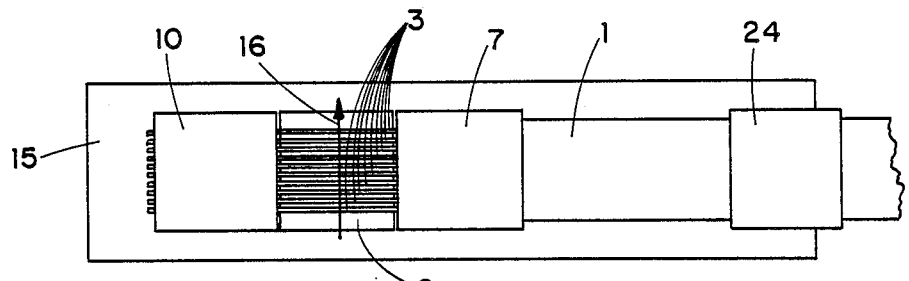
FIG. 4 is a plan diagrammatic illustration of the apparatus of FIG. 3.

Terminal block 7 is a removable component of a support apparatus 15 illustrated in FIG. 3 and 4. Projecting out from terminal block 7 are portions of the exposed optical fibers 3 that first extend over an anvil 8 and then are clamped into a terminal block 10. The anvil 8 includes a support face 9 that is slightly curved in a convex manner. A portion of the conductor unit 1 removed from the exposed end portion may itself be fixed in a terminal block 24.

The anvil 8 positioned between the terminal block 7 and terminal block 10 has a support face 9, formed in a convex manner so that the curvature increases beginning in the vicinity of the terminal block 7 and decreases in the vicinity of the terminal block 10. Further the support face 9 has a profile including grooved sections (not shown) for engaging the exposed optical fibers 3 in a manner to limit lateral deflection thereof. Preferably, such grooved sections have a lateral distance orientation that corresponds to the lateral distance orientation of the predetermined spacial orientations of the unexposed optical fibers 3.

The terminal block 7 is mounted on the support apparatus 15 so as to permit rotational movement about a pivot axis 11 in the direction indicated by arrow 12, the pivot arrangement being biased in such direction by the inherent weight of the terminal block 7, or by a biasing spring (not shown). A cutting device 13 is mounted above the anvil 8 in a manner to permit lateral displacement thereof in a plane transverse to the optical fibers 3, as indicated by the direction arrow 16 in FIG. 4. Such mounting of the cutting device 13 includes a biasing spring 13 that may be varied so as to accurately adjust the elevation of the cutting device 13 with respect to the support face 9 of the anvil 8.

The apparatus of FIGS. 3 and 4 for end cutting of the plurality of exposed portions of the optical fibers 3 is operated as follows:

Upon the exposure of portions of the optical fibers 3, as described above, they are fixed in the terminal block 7. The terminal block 7 is pivoted in a direction opposite to that of directional arrow 12 to assume the initial operating position illustrated in FIG. 3. Thereafter, the extending, exposed portions of the optical fibers 3 are placed on the support face 9 of anvil 8 and the free ends thereof are clamped into the terminal block 10. Consequently, the exposed portions of the optical fibers 3 ar placed in axial tension in accordance with the force exerted by the terminal block 7.

After the exposed optical fibers 3 are placed in axial tension in the manner noted above, the cutting device 13 is moved toward the supporting face 9 of the anvil B so as to be a distance therefrom slightly less than the thickness of the thinnest of the exposed optical fibers 3. Thereafter, the cutting device 13 is laterally moved in the direction of the arrow 16 from one side of the anvil 8 to the other, thus scratching each of the exposed optical fibers 3 on its upper surface. Due to the curvature of the support face 9 and the tension force exerted by the terminal block 7, each of the scratched exposed optical fibers 3 breaks to form a new end face with a plane surface located within a common transverse plane established by the lateral movement of the cutting device 13. After each of the plurality of scratched optical fibers 3 are so broken, the terminal block 7 pivots in the direction of the arrow 12, to assume an open condition.

The aforesaid new end faces of the optical fibers 3 extend a sufficient distance from the terminal block 7 to permit welding of each of such faces to an end face of an optical fiber similarly configured. It is emphasized that though the terminal block 7 has assumed it open condition, the exposed optical fibers 3 extending therethrough continue to be clamped so as to maintain the predetermined spacial orientation.

Figure 5:
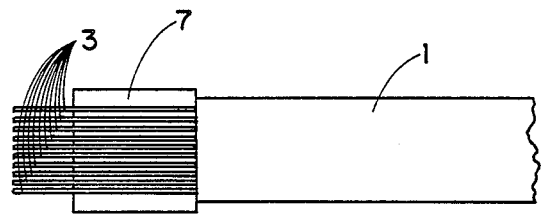
FIG. 5 is a plan view of a portion of the light conductor unit of FIG. 1, having the plurality of optical fibers clamped so as to maintain their spacial orientations, and having new end faces formed in a common transverse plane in accordance with the employment of the apparatus of FIG. 3 and FIG. 4.
Figure 6:
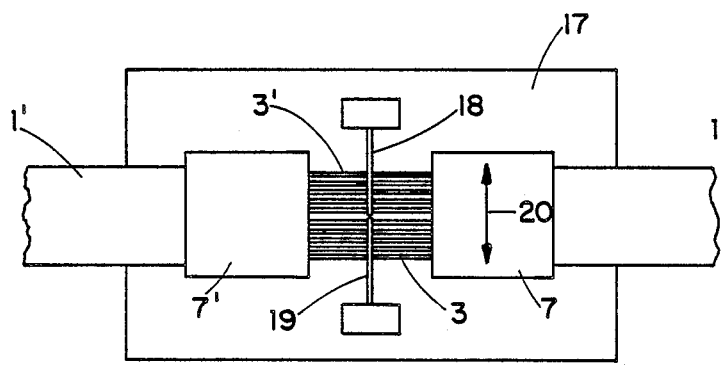
FIG. 6 is a plan diagrammatic illustration of an apparatus in accordance with the instant invention for welding each of the new end faces of the plurality of optical fibers of light conductor unit clamped and formed in the manner illustrated by FIG. 5, to a corresponding plurality of new end faces of a plurality of optical fibers of a second light conductor unit cut, clamped and formed in a similar manner.

The combination of the terminal block 7 and the clamped end of conductor unit 1 is removed from the support apparatus 15 of FIGS. 5 and 6, and placed into a welding apparatus 17, as illustrated in FIG. 6. In this location, the exposed optical fibers 3 extending through terminal block 7 continue to be clamped in the same predetermined spacial orientation as the unexposed portions of optical fibers 3 in the conductor unit 1. FIG. 5 illustrates a plan view of the terminal block 7, with the upper clamping cover omitted to illustrate a clamping face of such terminal block engaging the exposed optical fibers 3. There is depicted in FIG. 6 a second conductor unit 1' an end portion of which has been exposed and clamped by a second terminal block 7'; such combination having been formed in the same manner described above with respect to terminal block 7 and conductor unit 1. Consequently, the plurality of exposed optical fibers 3' extending through the terminal block 7' are clamped in the same predetermined spacial orientation as the unexposed portions of the optical fibers 3' in the conductor unit 1'. The terminal block 7' and exposed optical fibers 3' are inserted in the welding apparatus 17 so as to have the end faces of each of the exposed optical fibers 3' in flush contact with corresponding end faces of each of the exposed optical fibers 3 of the conductor unit 1.

The plurality of end faces of the exposed optical fibers 3 are welded sequential to the end faces of the plurality of exposed optical fibers 3'. For this purpose, there is provided a welding arc formed by a pair of welding electrodes 18 and 19. The terminal blocks 7 and 7' are mounted in the welding apparatus 17 so as to permit the transverse movement thereof as indicated by direction arrow 20. Thus, each pair of end faces of aligned exposed optical fibers 3 and 3' may be sequentially fed into the welding arc formed by the welding electrodes 18 and 19. Preferably the welding electrodes 1B and 19 are at an acute angle of 45 degrees about the vertical.

Since the end faces of the exposed optical fibers 3 and 3' are disposed adjacent to each other with their predetermined spacial orientations fixed as noted above, no further individual optical fiber alignment adjustments are required for the sequential welding. Further, the predetermined spacial orientation of the optical fibers in the conductor units is selected so that there is sufficient space between the adjacent optical fibers so as to avoid heat overlap or interference during each welding of each pair of optical fibers.

Figure 7:
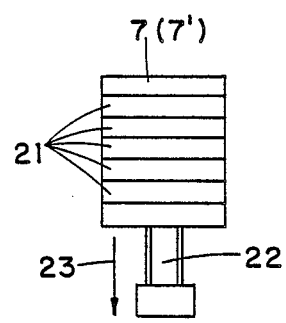
FIG. 7 is a diagrammatic illustration of a clamping mechanism employed in the apparatus of FIG. 3, which is removable to the Welding apparatus of FIG. 6, that maintains the spacial orientation of the exposed portions of the plurality of optical fibers during both the cutting and the welding operations.

Advantageously, the optical fibers 3 and 3' are sequentially welded starting from one side of the plurality of optical fibers to the other. Under certain circumstances it is desired that the welded pairs of optical fibers 3 and 3' be released or unclamped by the terminal blocks 7 and 7' before all of the plurality of optical fibers 3 and 3' have been welded. For this purpose, the clamping face of the terminal blocks 7 and 7' are separated into at least two clamping segments 21, whose separating plane extends in the direction of the optical fibers 3 and 3' to be clamped. Five such clamping segments 21 are depicted in FIG. 7 each being of a width that two adjacent optical fibers 3 are engaged by the one clamping segment 21. Each of the clamping segments 21 is held in place by a screw 22, the support being provided by the screw threads.

While the invention has been described in connection with an exemplary embodiment thereof, it will be understood that many modifications will be apparent to hose of ordinary skill in the art and that this application is intended to cover any adaptations or variations thereof. For example, though the welding procedure hereinabove involved a pair of conductor units having a similar number of optical fibers, the welding steps may involve conductor units having different pluralities of optical fibers with selective individual welding. Therefore, it is manifestly intended that the invention be only limited by the claims and equivalents thereof.

What is claimed:

1. Method for connecting a first plurality of optical waveguides arranged in a first ribbon line to a second plurality of optical waveguides arranged in a second ribbon line, each optical waveguide of the first plurality of optical waveguides comprising a first glasfiber with a surrounding protective covering, each optical waveguide of the second plurality of optical waveguides comprising a second glasfiber with a surrounding protective covering, said first plurality of optical waveguides being positioned between two support tapes of said first ribbon line that maintain a first predetermined spacial orientation of said first glasfibers, said second plurality of optical waveguides being positioned between two support tapes of said second ribbon line that maintain a second predetermined spacial orientation of said second glasfibers; comprising the steps of:

removing an end portion of each of said two support tapes and said protective coverings from said first plurality of optical waveguides to expose first end portions of said first glasfibers, and removing an end portion of each of said two support tapes and said protective coverings from said second plurality of optical waveguides to expose second end portions of said second glasfibers;

fixing the spacial orientation of said first exposed end portions by clamping said first exposed end portions between a first terminal block and a second terminal block which maintain said first exposed end portions in axial tension, and fixing the spacial orientation of said second exposed end portions by clamping said second exposed end portions between a third terminal block and a fourth terminal block which maintain said second exposed end portions in axial tension;

scratching a surface of each of said first exposed end portions in axial tension in a first common plane, transverse of the axial direction of said first exposed end portions for causing each of said first exposed end portions to separate and form a new end face lying in said first common plane, and scratching a surface of each of said second exposed end portions in axial tension in a second common plane, transverse of the axial direction of said second exposed end portions for causing each of said second exposed end portions to separate and form a new end face lying in said second common plane;

maintaining the fixed spacial orientation of said first exposed end portions with said new end faces in said first common plane by means of said first terminal block, and maintaining the fixed spacial orientation of said second exposed end portions with said new end faces in said second plane by means of said third terminal block;

positioning said first and third terminal blocks in a face-to-face orientation, with said new end faces of said first exposed end portions adjacent to corresponding new end faces of said second exposed end portions; and welding said new end faces of said first exposed end portions to said adjacent new end faces of said second exposed end portions.

2. Method in accordance with claim 1, wherein said welding step comprises the individual passage of pairs of adjacent new end faces of individual glasfibers of the said first and second ribbon lines, through a welding arc, for the sequential welding of said first and second glasfibers.

3. Method in accordance with claim 1, wherein, upon the welding of an end face of a glasfiber from said second plurality to an end face of a glasfiber from said first plurality, at least one welded pair of glasfibers is released from said first and third terminal blocks, before welding the sequentially following next pair of glasfibers.

4. Method in accordance with claim 1, wherein said first exposed portions of said first glasfibers extending between said first and second terminal blocks are placed onto a convex face of an anvil having a sectioning corresponding to said first predetermined spacial orientation for engaging the first exposed end portions of said first glasfibers so as to limit lateral deflection.

5. Apparatus for connecting first glasfibers of a first plurality of optical waveguides arranged in a first ribbon line to second glasfibers of a second plurality of optical waveguides arranged in a second ribbon line, said first plurality of optical waveguides being positioned between two support tapes of said first ribbon line that maintain a first predetermined spacial orientation of said first glasfibers, said second plurality of optical waveguides being positioned between two support tapes of said second ribbon line that maintain a second predetermined spacial orientation of said second glasfibers; comprising:

first means for fixing the spacial orientation of first exposed end portions of said first glasfibers while maintaining each of said first exposed end portions in axial tension, said first fixing means including a first terminal block and a second terminal block between which said first exposed end portions are clamped, and second means for fixing the spacial orientation of second exposed end portions of said second glasfibers while maintaining each of said second exposed end portions in axial tension, said second fixing means including a third terminal block and a fourth terminal block between which said second exposed end portions are clamped;

first means for scratching a surface of each of said first exposed end portions in axial tension in a first common plane, transverse of the axial direction of said first exposed end portions for causing each of said first exposed end portions to separate and form a new end face lying in said first common plane, and second means for scratching a surface of each of said second exposed end portions in tension in a second common plane, transverse of the axial direction of said second exposed end portions for causing each of said second exposed portions to separate and form a new end face lying in said second common plane;

means for welding said new end faces of said first exposed end portions to adjacent new end faces of said second exposed end portions, said welding means including means for positioning said first and third terminal blocks in a face-to-face orientation, with said first terminal block maintaining the fixed spacial orientation of said first exposed end portions and said third terminal block maintaining the fixed spacial orientation of said second exposed end portions so as to have said new end faces of said first exposed end portions adjacent to corresponding new end faces of said second exposed end portions.

6. Apparatus in accordance with claim 5, wherein said first means for fixing the spacial orientation of exposed end portions of said first glasfibers of said first plurality includes an anvil mounted between said first terminal block and said second terminal block, said anvil having a convex support face and a sectioning corresponding to the first predetermined spacial orientation of the first plurality of glasfibers.

7. Apparatus in accordance with claim 6, wherein said convex support face has a curvature that increases from the side thereof closest to the first terminal block, and after passing through a maximum curvature, decreases in curvature at the side thereof closest to the second terminal block.

8. Apparatus in accordance with claim 6, wherein said first means for scratching a surface of said first exposed end portions in tension, includes a cutting device mounted above said anvil in a manner to permit lateral displacement in said first common plane.

9. Apparatus in accordance with claim 5, wherein at least one of the first and second terminal blocks is mounted upon a pivot axis, and is biased to move in a direction away from the other of said terminal blocks.

10. Apparatus in accordance with claim 5, wherein the first terminal block includes a clamping face subdivided into at least two clamping segments having separating planes that extend in the axial direction of said first glasfibers of said first plurality.

11. Apparatus in accordance with claim 10, wherein the width of said clamping segments is approximately equal to the width of two adjacently disposed first glasfibers of said first plurality.

12. Apparatus in accordance with claim 5, wherein at least a clamping face of said first terminal block is removable from said first means for fixing the spacial orientation of exposed end portions of said first glasfibers of said first plurality, and is insertable in said means for welding.

13. Apparatus in accordance with claim 12, wherein said means for welding includes mounting supports for receiving said first and third terminal blocks in a face-to-face orientation, with said first common plane being brought adjacent to said second common plane, so as to have said new end faces of said first exposed end portions of said glasfibers adjacent to corresponding new end faces of said second exposed end portions of said second glasfibers.

* * * * *